US012566981B2

(12) United States Patent
Harsola et al.

(10) Patent No.: US 12,566,981 B2
(45) Date of Patent: Mar. 3, 2026

(54) METHOD AND SYSTEM FOR EVENT PREDICTION BASED ON TIME-DOMAIN BOOTSTRAPPED MODELS

(71) Applicant: INTUIT INC., Mountain View, CA (US)

(72) Inventors: Shrutendra Harsola, Madhya Pradesh (IN); Vignesh Thirukazhukundram Subrahmaniam, Bangalore (IN)

(73) Assignee: INTUIT INC., Mountain View, CA (US)

( * ) Notice: Subject to any disclaimer, the term of this patent is extended or adjusted under 35 U.S.C. 154(b) by 1190 days.

(21) Appl. No.: 17/334,697

(22) Filed: May 29, 2021

(65) Prior Publication Data

US 2022/0383156 A1 Dec. 1, 2022

(51) Int. Cl.
*G06N 5/04* (2023.01)
*G06N 20/00* (2019.01)

(52) U.S. Cl.
CPC .............. *G06N 5/04* (2013.01); *G06N 20/00* (2019.01)

(58) Field of Classification Search
CPC ........ G06N 5/04; G06N 20/00; G06N 3/0442; G06N 20/20
See application file for complete search history.

(56) References Cited

U.S. PATENT DOCUMENTS

| | | | | |
|---|---|---|---|---|
| 11,232,465 | B2* | 1/2022 | Orr | G06N 7/01 |
| 2017/0169345 | A1* | 6/2017 | de Knijf | H04L 67/535 |
| 2017/0220933 | A1* | 8/2017 | Gonguet | G06N 20/00 |
| 2018/0243656 | A1* | 8/2018 | Aghdaie | A63F 13/67 |
| 2018/0276544 | A1* | 9/2018 | Chakraborty | G06N 5/022 |
| 2020/0019852 | A1* | 1/2020 | Yoon | G06N 3/088 |
| 2021/0241141 | A1* | 8/2021 | Dugger | G06N 5/04 |
| 2022/0366299 | A1* | 11/2022 | Sinha | G06F 3/0484 |

OTHER PUBLICATIONS

Chawla, Nitesh, Steven Eschrich, and Lawrence O. Hall. "Creating ensembles of classifiers." Proceedings 2001 IEEE International Conference on Data Mining. IEEE, 2001. (Year: 2001).*

* cited by examiner

*Primary Examiner* — Matthew Ell
*Assistant Examiner* — Blaine T Basom
(74) *Attorney, Agent, or Firm* — Patterson + Sheridan, LLP

(57) ABSTRACT

Certain aspects of the present disclosure provide techniques for training and using time-domain bootstrapped event prediction models to predict the occurrence of an event within a software application. An example method generally includes receiving a data set of user activity within a software application. A request to predict a likelihood of an event occurring with respect to the software application based on the user activity is received. A likelihood of the event occurring is predicted using an event prediction model. The event prediction model is generally configured to predict the likelihood of the event occurring based on a likelihood over each of a plurality of non-overlapping time windows. A likelihood of the event occurring within a first time window is conditioned on a likelihood of the event occurring within a second time window. One or more actions are taken within the software application based on the predicted likelihood.

16 Claims, 5 Drawing Sheets

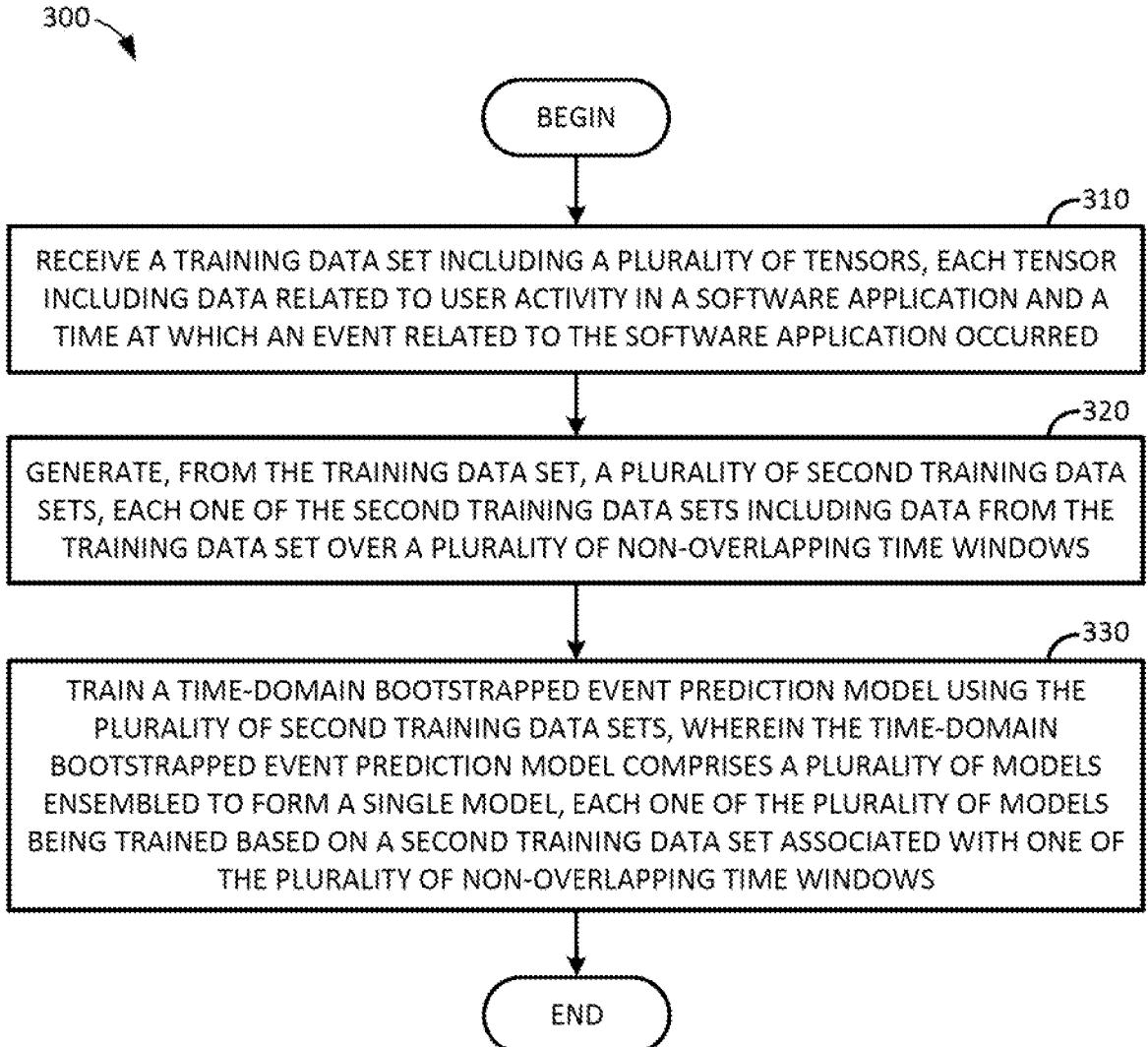

300

BEGIN

310

RECEIVE A TRAINING DATA SET INCLUDING A PLURALITY OF TENSORS, EACH TENSOR INCLUDING DATA RELATED TO USER ACTIVITY IN A SOFTWARE APPLICATION AND A TIME AT WHICH AN EVENT RELATED TO THE SOFTWARE APPLICATION OCCURRED

320

GENERATE, FROM THE TRAINING DATA SET, A PLURALITY OF SECOND TRAINING DATA SETS, EACH ONE OF THE SECOND TRAINING DATA SETS INCLUDING DATA FROM THE TRAINING DATA SET OVER A PLURALITY OF NON-OVERLAPPING TIME WINDOWS

330

TRAIN A TIME-DOMAIN BOOTSTRAPPED EVENT PREDICTION MODEL USING THE PLURALITY OF SECOND TRAINING DATA SETS, WHEREIN THE TIME-DOMAIN BOOTSTRAPPED EVENT PREDICTION MODEL COMPRISES A PLURALITY OF MODELS ENSEMBLED TO FORM A SINGLE MODEL, EACH ONE OF THE PLURALITY OF MODELS BEING TRAINED BASED ON A SECOND TRAINING DATA SET ASSOCIATED WITH ONE OF THE PLURALITY OF NON-OVERLAPPING TIME WINDOWS

END

FIG. 3

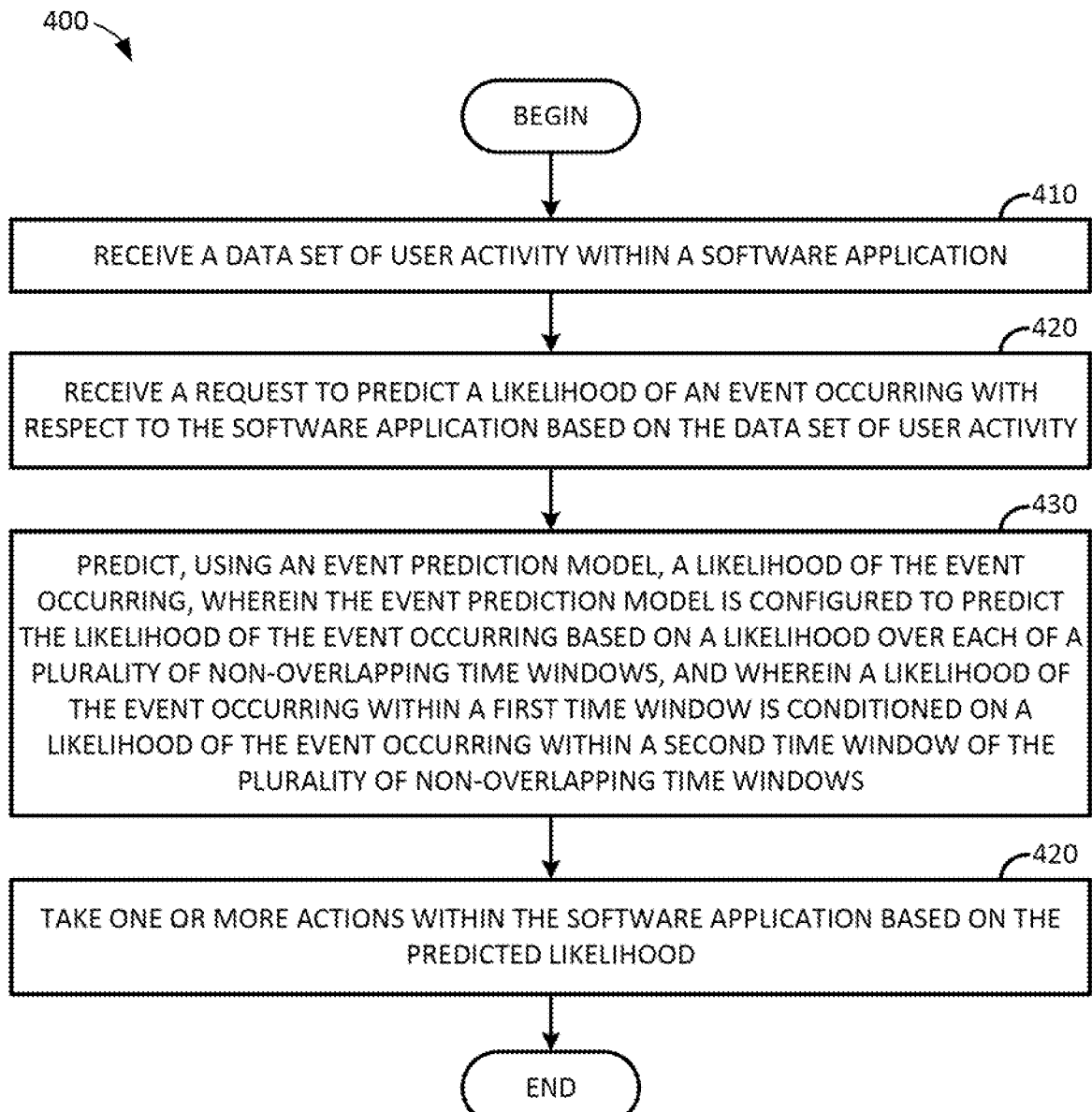

400

BEGIN

┌─ 410
RECEIVE A DATA SET OF USER ACTIVITY WITHIN A SOFTWARE APPLICATION

┌─ 420
RECEIVE A REQUEST TO PREDICT A LIKELIHOOD OF AN EVENT OCCURRING WITH RESPECT TO THE SOFTWARE APPLICATION BASED ON THE DATA SET OF USER ACTIVITY

┌─ 430
PREDICT, USING AN EVENT PREDICTION MODEL, A LIKELIHOOD OF THE EVENT OCCURRING, WHEREIN THE EVENT PREDICTION MODEL IS CONFIGURED TO PREDICT THE LIKELIHOOD OF THE EVENT OCCURRING BASED ON A LIKELIHOOD OVER EACH OF A PLURALITY OF NON-OVERLAPPING TIME WINDOWS, AND WHEREIN A LIKELIHOOD OF THE EVENT OCCURRING WITHIN A FIRST TIME WINDOW IS CONDITIONED ON A LIKELIHOOD OF THE EVENT OCCURRING WITHIN A SECOND TIME WINDOW OF THE PLURALITY OF NON-OVERLAPPING TIME WINDOWS

┌─ 420
TAKE ONE OR MORE ACTIONS WITHIN THE SOFTWARE APPLICATION BASED ON THE PREDICTED LIKELIHOOD

END

FIG. 4

METHOD AND SYSTEM FOR EVENT PREDICTION BASED ON TIME-DOMAIN BOOTSTRAPPED MODELS

INTRODUCTION

Aspects of the present disclosure generally relate to event prediction in software applications, and more specifically to predicting events using time-domain bootstrapped machine learning models.

BACKGROUND

Software applications are generally deployed for use by many users for the performance of a specific function. These applications may be deployed, for example, as web applications accessible over a network, such as the Internet or a private network, or as desktop applications that include static components executed from a local device and dynamic components executed from content retrieved from a network location. These applications can include financial applications, such as tax preparation applications, accounting applications, personal or business financial management applications; social media applications; electronic communications applications; and so on. These software applications generally include help functions that users frequently interact with to obtain information about how to perform various tasks within the software application. Some applications may additionally provide execution environments for the use of third-party plugins, extensions, helpers, and other components to add functionality to these applications. These components may be available for users to download or otherwise link to an instance of a software application through an application store.

Usage patterns within a software application may include information that can be used to predict future user activity with respect to the software application. For example, usage patterns of features in the software application may be predictive of various events related to the software application, such as discontinuing use of the software application, changing subscriptions to obtain access to additional features in the software application, connecting external applications to the software application, and the like. In another example, usage patterns of features in the software application may also be predictive of the types of content with which the user may be interested in interacting (e.g., help content, other explanatory information, etc.).

However, many events related to a software application may be one-time events that rarely occur. For example, a small subset of a global universe of users of the software application may actually discontinue use of the software application. Training a machine learning model to predict a likelihood that other users will discontinue use of the software application may, thus, be limited to training using a small set of data (e.g., data for users who have discontinued use of the software application), which may greatly limit the generalizability of the model. The predictions made by these machine learning models may thus be inaccurate and may cause the software application to perform actions that are not relevant for a given user, which may negatively affect user experience and actually drive user abandonment.

Accordingly, techniques are needed to train machine learning models for accurate event prediction.

BRIEF SUMMARY

Certain embodiments provide a computer-implemented method for training an event prediction model. An example method generally includes receiving a training data set including a plurality of tensors. Each respective tensor in the plurality of tensors generally includes data related to user activity in a software application and an indication of a time at which an event related to the software application occurred. A plurality of second training data sets are generated from the training data set. Each training data set of the second training data sets includes data from the training data set over a plurality of non-overlapping time windows. A time-domain bootstrapped event prediction model is trained using the plurality of second training data sets. The time-domain bootstrapped event prediction model generally includes a plurality of models ensembled to form a single model, and each one of the plurality of models may be trained based on a second training data set associated with one of the plurality of non-overlapping time windows. The time-domain bootstrapped event prediction model is generally trained to predict the occurrence of the event based on conditional probabilities generated for an input by each model in the plurality of models.

Other embodiments provide a computer-implemented method for predicting event occurrence based on a trained event prediction model. The method generally includes receiving a data set of user activity within a software application. A request to predict a likelihood of an event occurring with respect to the software application based on the data set of user activity is received. A likelihood of the event occurring is predicted using an event prediction model. The event prediction model is generally configured to predict the likelihood of the event occurring based on a likelihood over each of a plurality of non-overlapping time windows. A likelihood of the event occurring within a first time window of the plurality of non-overlapping time windows is generally conditioned on a likelihood of the event occurring within a second time window of the plurality of non-overlapping time windows. One or more actions are taken within the software application based on the predicted likelihood.

Other embodiments provide processing systems configured to perform the aforementioned methods as well as those described herein; non-transitory, computer-readable media comprising instructions that, when executed by one or more processors of a processing system, cause the processing system to perform the aforementioned methods as well as those described herein; a computer program product embodied on a computer readable storage medium comprising code for performing the aforementioned methods as well as those further described herein; and a processing system comprising means for performing the aforementioned methods as well as those further described herein.

The following description and the related drawings set forth in detail certain illustrative features of one or more embodiments.

BRIEF DESCRIPTION OF THE DRAWINGS

The appended figures depict certain aspects of the one or more embodiments and are therefore not to be considered limiting of the scope of this disclosure.

FIG. 3 illustrates example operations for training a time-domain bootstrapped event prediction model to predict event occurrence in a software application.

FIG. 4 illustrates example operations for predicting event occurrence in a software application using a time-domain bootstrapped event prediction model.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Figure 1:
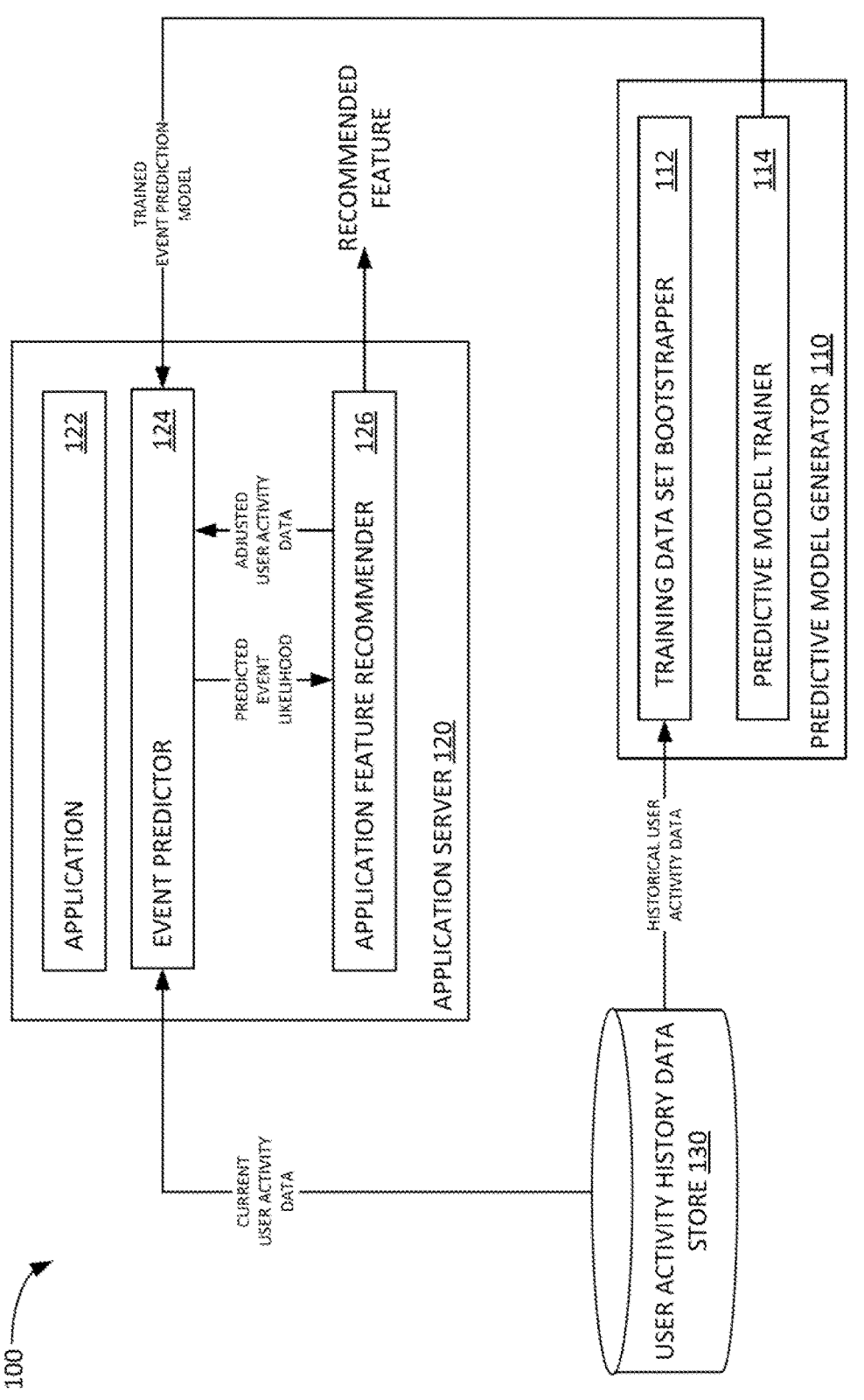
FIG. 1 illustrates a system in which time-domain bootstrapped event prediction models are trained and used to predict event occurrence in a software application.

Aspects of the present disclosure provide apparatuses, methods, processing systems, and computer-readable mediums for predicting a likelihood of an event occurring in a software application using time-domain bootstrapped machine learning models.

Generally, user activity history of actions performed within a software application is used to train predictive models to predict the likelihood of an event occurring in a software application. The user activity history generally includes information identifying functionality of the software application invoked by the user, a time at which the user invoked the identified functionality, clickstream data identifying actions performed with respect to user interface elements in the software application, and the like. Typically, machine learning models may be trained using "baked" data, or data associated with users for which an event of interest has already occurred. For example, to train a predictive model to predict whether a user will discontinue use of a software application, a system can train the predictive model using a data set that may be heavily biased towards users who have not discontinued use of the software application. Further, by treating data over different time periods similarly in training machine learning models to predict when an event will occur, data may be discarded. For example, treating a data set for a first user of an application who has not yet performed an event after 35 days similarly to a data set for a second user who has not yet performed the event after 145 days essentially discards 35 days of data for the second user because the second user has necessarily not performed the event after 35 days. Thus, the predictive model may not be able to use all of the available information to make predictions To improve the accuracy of predictive models, a prediction task may be decomposed into a series of classification tasks. In decomposing a prediction task into a series of classification tasks, the probability of an event occurring may be represented as a statistical measure over a plurality of disjoint classification tasks.

In a simple example, where training data is divided into two time periods, the prediction task may be decomposed into predicting a probability that an event will occur (or not occur) during a first time period and predicting a probability that the event will occur (or not occur) during a second time period. The accuracy of the model may depend on the number of time periods into which training data sets are divided; generally, as a training data set is divided into smaller data sets corresponding to different time periods and each of these smaller data sets is used to train independent models, the accuracy of the resulting predictive model may increase since each independent model can be trained to make a prediction over shorter time periods. Changes in the number of data sets into which a training data set is divided—and correspondingly, the number of machine learning models trained to predict the occurrence of an event—generally impose a tradeoff between bias and variance. Bias generally refers to a difference between a predicted value generated by a machine learning model and the expected value of a prediction. A model with high bias may miss relationships between data and thus may result in the generation of inaccurate predictions. Variance generally refers to the sensitivity of a machine learning model to noise in a data set. Larger numbers of training data sets (and correspondingly larger numbers of models trained using these training data sets) may increase the accuracy of event occurrence predictions (i.e., would decrease bias), but may increase the variance of a resulting model due to the decreased size of each data set. Smaller numbers of training data sets may, conversely, decrease the accuracy of event occurrence predictions (i.e., would increase bias) but decrease the variance of the resulting model. Thus, models trained using larger numbers of training data sets may have reduced reproducibility relative to models trained using smaller numbers of training data sets due to the increased variance, such that similar (but not the same) data sets may result in significantly different predictions. Further, increasing the number of training data sets and the number of machine learning models trained to predict the occurrence of an event may use additional processing time, memory, and other computing resources.

Embodiments presented herein provide techniques for training and using event prediction models to predict the likelihood of an event occurring using time-domain bootstrapped data with randomly selected bootstrap division points. By randomly selecting a number of bootstrap division points, dividing a training data set into a plurality of smaller training data sets based on the randomly selected number of bootstrap division points, and training an event prediction model based on the plurality of smaller training data sets, embodiments presented herein achieve a balancing between bias and variance of a trained event prediction model. Further, embodiments presented herein allow for the use of both baked data (as discussed above) and "unbaked" data, or data associated with users for which an event of interest has not yet occurred, in training and using an event prediction model. By using unbaked data in training an event prediction model, embodiments presented herein may further increase the accuracy and reproducibility of predictions made using an event prediction model, and thus allow for more applicable actions to be performed or recommended for performance within a software application. Still further, by allowing for the random selection of a limited number of bootstrap division points and training an event prediction model based on a plurality of smaller training data sets generated based on the randomly selected bootstrap division points, embodiments presented herein may reduce the amount of processing time used in training an ensembled event prediction model and may reduce the amount of memory used in storing an ensembled event prediction model relative to predictive models in which a large number of models trained over data from small time periods are ensembled.

Example Training and Using Time-Domain
Bootstrapped Event Prediction Models to Predict a
Likelihood of an Event Occurring in a Software
Application FIG. 1 illustrates an example computing environment 100 in which a time-domain bootstrapped event prediction model is trained and used to predict a likelihood of an event occurring in a software application, and to trigger execution of one or more actions within the software application based on the predicted likelihood of the event occurring. As illustrated, computing environment 100 includes a predictive model generator 110, an application server 120, and a user activity history data store 130.

Predictive model generator 110 is generally representative of one or more physical or virtual computing devices which can generate training data sets and train a time-domain bootstrapped event prediction model based on the generated training data sets. As illustrated, predictive model generator 110 includes a training data set bootstrapper 112 and a predictive model trainer 114.

Training data set bootstrapper 112 is generally configured to generate a plurality of time-domain bootstrapped training data sets from historical user activity data. To generate the plurality of time-domain bootstrapped training data sets from the historical user activity data, training data set bootstrapper 112 can retrieve historical user activity data from user activity history data store 130. Generally, the historical user activity data includes information about user interaction within application 122, such as timestamped data identifying when a user performed various actions within the application 122, an activity history counter identifying a number of times each of a plurality of actions was performed by a user, clickstream information, and the like. The historical user activity data from which the time-domain bootstrapped training data sets may be selected based on a priori defined features that have been determined to be predictive of whether a given event will occur with respect to the application for a given user of the application 122. The historical user activity data may be raw data from which a training data set can be generated (e.g., by grouping related actions together into a single record of an action being performed within application 122) or may be directly divided into the plurality of time-domain bootstrapped training data sets where the predictive model is trained to make predictions based on timing relationships between the occurrence of different events within application 122. The historical user activity data may be associated with particular groups of features within an application. For example, in an accounting application, the historical user activity data may be associated with a group of invoice generation functions, a group of invoice review functions, a group of report generation functions, and the like.

To generate the plurality of time-domain bootstrapped training data sets, training data set bootstrapper 112 can randomly select a set of time breakpoints based on which the plurality of time-domain bootstrapped training data sets are to be generated. The number n of breakpoints in the randomly selected set may be defined a priori or randomly selected within a defined lower bound and upper bound, resulting in the generation of n+1 time-domain bootstrapped training data sets.

Each breakpoint in the set may be associated with a time period over which the historical user activity data is to be divided and may be selected based on a monotonically increasing pattern such that the resulting time windows over which the historical user activity data is divided are non-overlapping time windows. Further, the breakpoints may be randomly selected with a minimum and (optionally) maximum distance from a previous breakpoint so that a sufficient amount of training data is included in each of the plurality of training data sets generated based on the set of breakpoints. That is, the breakpoints may be selected such that a first training data set includes data from an origin time point to a first time point, a second training data set includes data from the first time point to a second time point, a third training data set includes data from the second time point to a third time point, and so on, and the breakpoints may span at least a minimum amount of time.

As an illustrative example, suppose that training data set bootstrapper selects four bootstrap points and the bootstrap points are days 30, 60, 90, and 120. In this example, a first training data set may include data from days 1 through 30; a second training data set may include data from days 31 through 60; a third training data set may include data from days 61 through 90; a fourth training data set may include data from days 91 through 120, and a fifth training data set may include data from day 121 onwards. It should be recognized that the selected bootstrap points are an example only, and any randomly selected set of bootstrap points may be used to generate the plurality of time-domain bootstrapped training data sets.

The plurality of time-domain bootstrapped training data sets may be structured based on a type of the event prediction model. In one example, where the event prediction model is structured as a plurality of long-short term memory (LSTM) models, or other machine learning models in which a likelihood of an event occurring can be predicted based on timing relationships between sequential actions within application 122, the plurality of time-domain bootstrapped training data sets may include time-sequence data for each user included in the historical user activity data. The time-sequence data generally includes information identifying the sequence of user actions performed during a time window associated with a specific one of the plurality of time-domain bootstrapped training data sets. Generally, LSTM models are recurrent neural networks in which patterns or relationships between time-series data can be learned in order to predict the occurrence of future events from a time-series data input. LSTM models may be useful, for example, when the sequence of actions in the time-series data, and not just a raw number of actions performed, may be predictive of future actions performed within an application.

In some embodiments, the time-sequence data may include clickstream data identifying a sequence of user actions with respect to various user interface elements (corresponding to various functions in application 122), information identifying specific functionality the user invoked, or the like. Using the example discussed above, the first training data set may thus include time-sequence data from days 1 through 30, the second training data set may include time-sequence data from days 31 through 60, and so on.

In another example, the event prediction model may be configured to predict a likelihood of an event occurring based on a number of times each of a plurality of specific actions are performed within application 122. For example, neural networks including a softmax layer may be used to predict a probability that an event will not occur and a probability that the event will occur. In this example, training data set bootstrapper 112 can generate the plurality of data sets by generating, for each specific action, a count of the number of occurrences of the user performing the specific action within each of the plurality of time windows. The resulting training data sets may thus include a single tensor for each user for which historical activity data exists. This single tensor may include a count of the number of occurrences of the user performing each of a plurality of actions that may be predictive of an event occurring (or not occurring) within application 122. These actions may include, for example, logging into the application, using specific functionality within the application, requesting assistance from one or more support systems for the application, and so on.

The architecture selected for the event prediction model may be based on whether or not predictions are sensitive to time relationships between actions performed within application 122. When the likelihood of an event occurring is determined to be sensitive to the exact order of actions performed by a user within application 122 (e.g., the order in which various functionality of the application 122 is invoked), LSTM models or other models that recognize timing relationships may be used. In other cases, when the likelihood of an event occurring is sensitive to the number of times particular actions are performed over a time period, but not to the timing relationships between the execution of different actions within application 122, other predictive models, such as clustering models, classification models, or the like, may be used.

Predictive model trainer 114 generally uses the training data sets generated by training data set bootstrapper 112 to train and deploy time-domain bootstrapped event prediction models. In some cases, a time-domain bootstrapped event prediction model includes a plurality of models ensembled to form a single model. By ensembling the plurality of models into a single model, the accuracy of the time-domain bootstrapped event prediction model may be improved relative to a single model trained using a non-bootstrapped training data set. As discussed in further detail below, the time-domain bootstrapped event prediction model generally generates predictions based on predictions made by each of the plurality of models that are ensemble together to form the time-domain bootstrapped event prediction model. Each model of the plurality of models may be trained using one of the plurality of training data sets generated by training data set bootstrapper 112. Thus, each respective model of the plurality of models may be associated with one time window from a plurality of non-overlapping time windows and may make predictions of the likelihood that an event will occur within the time window associated with the respective model.

Predictive models generated by predictive model trainer 114 may be generally based on a model in which a likelihood of an event occurring within application 122 is represented by the equation:

$$P(T_i > t) = e^{-\int_0^t \lambda_i(s)ds} \text{ for } 1 \le i \le N \tag{1}$$

where $\lambda_i(s)$ is the hazard rate at time s, and t represents a given point in time after which a prediction of the event occurring is to be made, $T_i$ represents an event occurring for a given user i after time t, and N represents the universe of users. The hazard rate $\lambda_i(s)$ is generally a function of time and past activity, and may be represented by the equation:

$$\lambda_i(t) = G_i(t_i\{X_i(s),0 \le s < t\}) \tag{2}$$

where $X_i(t)=[x_{i1}(t), x_{i2}(t), \ldots, x_{im}(t)]$ represents the set of actions performed within the application 122 by the $i^{th}$ user in a training data set and where $G_i$ is a function for a user i that takes a time t and a sequence of actions X(t) as input to calculate the hazard rate. As discussed, the set of actions may include clickstream data or other feature usage activity within the software application.

Equation (1) may be alternatively represented as a series of conditional probabilities, where the probability of an event occurring at time T for a given user i (i.e., event T) is conditioned on the probability of the event occurring at time T−1, and so on. Thus, assuming that T is an integer value, Equation (1) may be alternatively represented as:

$$P(T_i > t) = P(T_i > t | T_i > t-1) \times P(T_i > t-1 | T_i > t-2) \times \ldots \times P(T_i > 1 | T_i > 0) \times P(T_i > 0) \tag{3}$$

By substituting the hazard rate function) in equation (1), and by assuming $G_i$ to be identical for each user of application 122, equation (1) may alternatively be represented by the equation:

$$P(T_i > t | T_i > t-1) = e^{-G_i(t_i\{X_i(s),0 \le s < t\})} \tag{4}$$

When estimated by a classification algorithm, this probability for a user i may thus be represented as the function of time t and user activity history over a time period prior to time t, according to the long-form equation:

$$P(T_i > t | T_i > t-1) = F(t,\{X_i(s),0 \le s \le t-1\}) \tag{5}$$

In shorthand notation, equation (5) may be represented as:

$$P(T_i > t | T_i > t-1) = F_{it}(\Theta) \tag{6}$$

where $F_{it}(\Theta) = F(t, \{X_i(s), 0 \le s < t-1\})$ for the $i^{th}$ user at time t.

Predictive model trainer 114 may train a plurality of machine learning models, where each one of the machine learning models is trained using one of the time-domain bootstrapped training data sets generated by training data set bootstrapper 112. Each of the plurality of machine learning models may thus be trained to predict a conditional probability that an event will occur during a specific time window. The plurality of machine learning models may then be ensembled to form a single event prediction model, and the output of the single event prediction model may be based on the conditional probabilities generated by each of the plurality of machine learning models.

For example, the probability of an event occurring calculated by the single event prediction model may be represented as the product of the conditional probabilities generated by each of the plurality of constituent machine learning models ensembled to form the single event prediction model. In other examples, the probability of the event occurring calculated by the single event prediction model may use other statistical measures based on the conditional probabilities generated by teach of the constituent machine learning models ensembled to form the single event prediction model. For example, the probability may be calculated based on the median probability value generated by each of the constituent machine learning models.

A likelihood/of an event occurring (or not occurring) calculated by the event prediction model may be a log likelihood, represented by the equation:

$$l = -\sum_{i=1}^{n} \sum_{t=1}^{min(T_i,S)} l(T_i > t) \log(F_{it}(\Theta)) + l(T_i \le t)\log(1 - F_{it}(\Theta)) \tag{7}$$

where $l(T_i > t)$ represents a likelihood of the event occurring after time t and $l(T_i \le t)$ represents a likelihood of the event occurring at or before time t.

Because optimizing the log-likelihood may result in an optimization performed over a large number of operators, such an optimization may result in an overfitting model that accurately predicts a likelihood of an event occurring based on data included in a training data set but may exhibit significant variance in predicting the likelihood of the event occurring based on unseen data not included in the training data set. To mitigate the risk of overfitting to a training data set, the predictive model trained by predictive model trainer 114 may calculate a predicted likelihood according to the following equation:

$$l = -\sum_{i:T_i<s}\sum_{t=1}^{T_i-1}\log(F_{it}(\Theta)) - \qquad (8)$$

$$\sum_{i:T_i<s}\log(1-F_{iT_i}(\Theta)) - \sum_{i:T_i<s}\sum_{t=1}^{S}\log(F_{it}(\Theta))$$

where S represents a point in time for which the prediction is to be made.

In calculating a likelihood using time-domain bootstrapped event prediction models, the term:

$$-\sum_{i:T_i<S}\sum_{t=1}^{T_i-1}\log(F_{it}(\Theta))$$

may be dropped from equation (8), and the term:

$$-\sum_{i:T_i<S}\log(1-F_{iT_i}(\Theta))$$

may be retained in equation (8). The term:

$$\sum_{i:T_i<S}\sum_{t=1}^{S}\log(F_{it}(\Theta))$$

may correspond to a randomly selected time for each user for which data exists in the training data set. Thus, the likelihood l* of an event occurring (or not occurring) calculated by the time-domain bootstrapped event prediction model may be represented according to the equation:

$$l^* = -\sum_{i:T_i<S}\log(1-F_{iT_i}(\Theta)) - \sum_{i:T_i<S}\log(1-F_{iT_i^*}(\Theta)) \qquad (9)$$

After training the event prediction model, predictive model trainer 114 can deploy the trained event prediction model to event predictor 124 for use in predicting a likelihood of various events occurring for a user of application 122 and triggering actions to be performed based on the predicted likelihood, as discussed in further detail below.

Application server 120 is generally representative of one or more physical or virtual computing devices on which an application may be executed. Generally, application server 120 hosts an application 122, an event predictor 124, and an application feature recommender 126. Application 122 may be any type of application in which users can execute functions provided by the application and request content related to the application (e.g., help content, third-party applications or plugins that interact with the application, etc.) during execution of the functions provided by the application. As users interact with the application 122, log data related to user activity within the application 122 may be committed to user activity history data store 130 for further training of the event prediction model and to predict the occurrence that a given event will occur (e.g., that a user will discontinue use of the application 122, upgrade to a different version of the application 122 with additional features, purchase additional services for use with the application 122, etc.), as discussed in further detail below.

Event predictor 124 uses user activity data for a user of application 122 and the event prediction model trained by predictive model trainer 114 to predict a likelihood that a given event will occur for the user. As discussed, the event prediction model trained by predictive model trainer 114 may include a plurality of machine learning models ensembled to form a single model, and each of the plurality of machine learning models may be trained using training data in non-overlapping time windows. To predict the likelihood that the event will occur for the user, event predictor 124 may similarly bootstrap the user's activity history data into a plurality of data sets. Each one of the plurality of data sets may be generated based on the randomly selected set of bootstraps used to generate the training data sets from which each of the plurality of constituent machine learning models in the event prediction model were trained. Using the example discussed above, the user activity history may thus be divided into a first data set for the user's activity history between days 1 and 30, a second data set for the user's activity history between days 31 and 60, a third data set for the user's activity history between days 61 and 90, a fourth data set for the user's activity history between days 91 and 120, and a fifth data set for the user's activity history for day 121 and onwards.

Application feature recommender 126 can use the predicted event likelihood generated by event predictor 124 to identify whether an action is to be taken to prevent the event from occurring or to promote the occurrence of the event. Generally, for events related to a user discontinuing use of the application 122 or use of an add-on feature in the application 122, application feature recommender 126 can take one or more actions to improve the user's experience with the application 122. For events related to a user upgrading to a version of the application 122 or adding features to the application 122, application feature recommender 126 can take one or more actions to encourage the user to upgrade or add features to the application.

Generally, application feature recommender 126 can use various defined threshold likelihood values to determine whether an action is to be performed in response to the predicted event likelihood. By using these defined threshold values to determine whether an action is to be performed in response to the predicted event likelihood, application feature recommender 126 can reduce processing resources, bandwidth, memory, and other computing resources used in performing these actions by doing so only when an intervention is likely to be effective for the user. For example, where the predictive model is trained to predict a likelihood of a user discontinuing use of the application 122, application feature recommender 126 can use a determination that the predicted likelihood is greater than threshold predicted likelihood to trigger execution of one or more actions to discourage the user from discontinuing use of the application 122 or an add-on thereto. Conversely, where the predictive model is trained to predict a likelihood of a user continuing use of the application, application feature recommender 126 can use a determination that the predicted likelihood is less than the threshold predicted likelihood to trigger execution of one or more actions to discourage the user from discontinuing use of the application 122 or an add-on thereto. If application feature recommender 126 determines that the predicted event likelihood does not meet a defined threshold, application feature recommender 126 can terminate operations with respect to the user.

In some embodiments, application feature recommender 126 can recommend one or more features of the software application to a user in response to determining that one or more actions are to be taken based on the predicted event likelihood. For example, a priori defined mappings between user activity within application 122 and a product feature may be defined and used to recommend one or more additional features to the user in order to mitigate the risk that the user will discontinue use of the application. For each application feature for which user activity data is tracked and used to predict the likelihood of the event occurring, application feature recommender 126 can identify a sample value across all users of the application 122 to use in identifying which feature is to be recommended to the user. The sample value may be a median value across all users having activity history data in user activity history data store 130, an average value across all users having activity history data in user activity history data store 130, or other statistically determined values.

To determine which feature(s) to recommend to the user, application feature recommender 126 can request that event predictor 124 predict a likelihood of the event occurring using a sample value for each application feature in lieu of the user's actual history data. Using the predicted likelihood of the event occurring for each sample value (corresponding to an application feature to be recommended), application feature recommender 126 can identify the application feature that is most likely to achieve a defined goal with respect to the predicted likelihood of the event occurring. This defined goal may be, for example, decreasing the likelihood that the user will discontinue use of the application 122 or an add-on thereto, or increasing the likelihood that the user will upgrade to a more fully-featured version of the application 122 or begin using an add-on to application 122.

As an illustrative example, suppose that a predicted likelihood of a user discontinuing use of application 122 is modeled based on three variables, A, B, and C. The user's activity data includes 20 instances of activity related to variable A, 10 instances of activity related to variable B, and 0 instances of activity related to variable C, and the event prediction model calculates a likelihood that the user will discontinue use of the application 122 as 0.70. A sample value for an application feature to recommend related to variable A is 30, a sample value for an application feature related to variable B is 8, and a sample value for an application feature related to variable C is 5. To determine which application feature to recommend, application feature recommender 126 can request a predicted likelihood that the user will discontinue use of application 122 based on (1) changing the value of variable A to the sample value and using the user's activity history with respect to variables B and C; (2) changing the value of variable B to the sample value and using the user's activity history with respect to variables A and C; and (3) changing the value of variable C to the sample value and using the user's activity history with respect to variables A and B. Suppose, then, that the predicted probability where A equals 30, B equals 10, and C equals 0 is 0.60; the predicted probability where A equals 20, B equals 8, and C equals 0 is 0.65; and the predicted probability where A equals 20, B equals 10, and C equals 5 is 0.50. Application feature recommender 126 can determine that the change in predicted event probability is greatest when the value of variable C is changed and can thus recommend an application feature mapped to variable C to the user in order to minimize the risk of the user discontinuing use of application 122.

Figure 2:
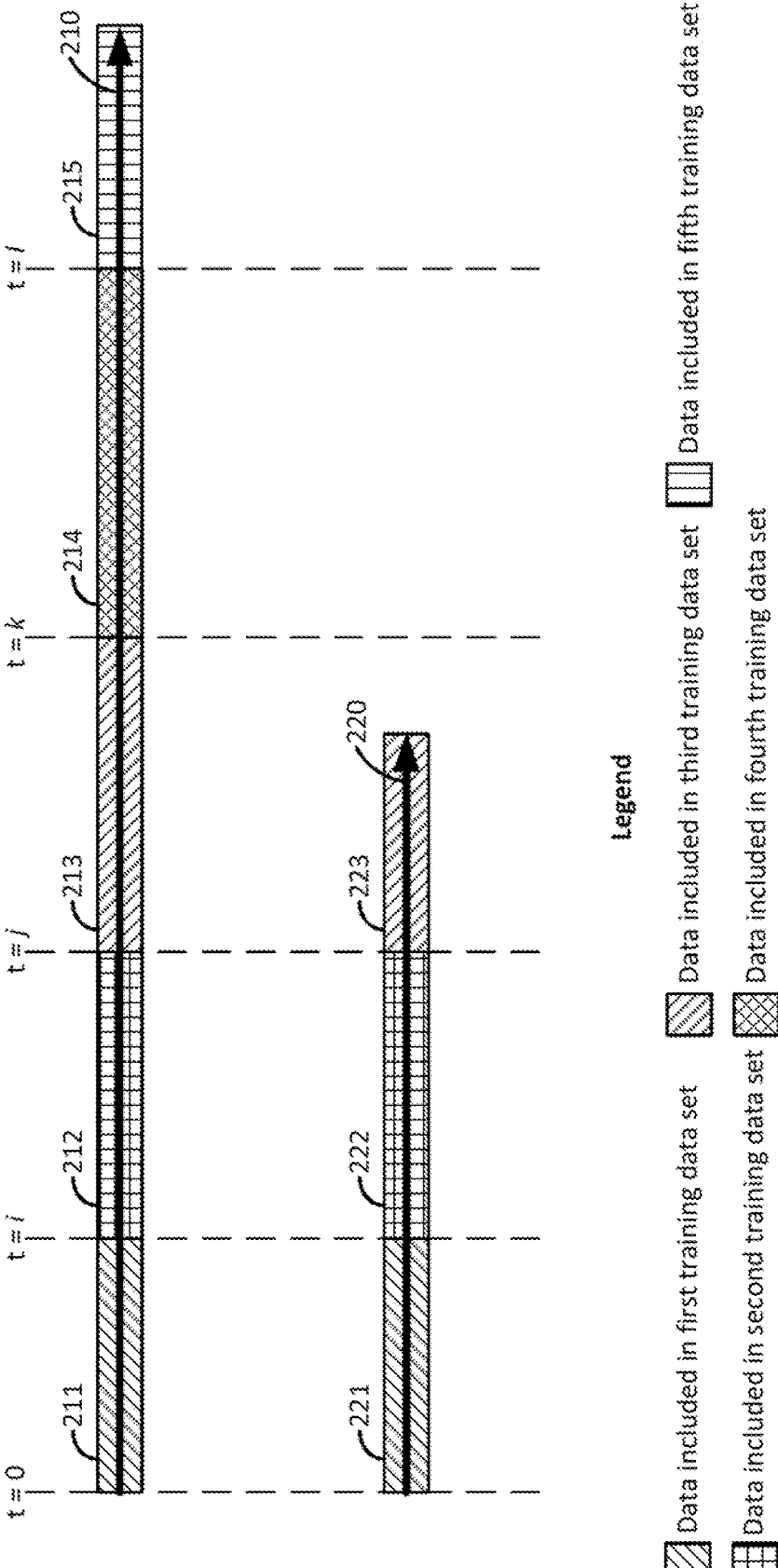
FIG. 2 illustrates an example time-domain bootstrapping of data in a training data set used to train a time-domain bootstrapped event prediction model.

Example Time-Domain Bootstrapping of Data for Training Time-Domain Bootstrapped Event Prediction Models FIG. 2 illustrates an example time-domain bootstrapping of data in a training data set used to train a time-domain bootstrapped event prediction model.

As illustrated, data set 200 includes a first data set 210 for a first user, and a second data set 220 for a second user. Additionally, in this example, four randomly selected bootstrap breakpoints, i, j, k, and l have been selected, where $i<j<k<l$. To generate the training data sets for the five machine learning models that will be ensembled to form the single event prediction model, a training data set bootstrapper (e.g., training data set bootstrapper 112 illustrated in FIG. 1) can divide the training data sets based on the randomly selected bootstrap breakpoints. Thus, in the example illustrated in FIG. 2, the data set 200 can be divided into a first training data set spanning times $t=0$ (i.e., an origin point in time) through $t=i$; a second training data set spanning times $t=i+1$ through $t=j$; a third training data set spanning times $t=j+1$ through $t=k$; a fourth training data set spanning times $t=k+1$ through $t=l$; and a fifth training data set including data from time $t=l+1$ onwards.

The first data set 210 includes sufficient data to generate tensors for each of the training data sets. Thus, the first training data set may include a tensor based on the data in window 211; the second training data set may include a tensor based on the data in window 212; the third training data set may include a tensor based on the data in window 213; the fourth training data set may include a tensor based on the data in window 214; and the fifth training data set may include a tensor based on the data in window 215. In contrast, the second data set may include data sufficient to generate tensors for only the first three time windows (and corresponding training data sets). Thus, the first training data set may include a tensor based on the data in window 221; the second training data set may include a tensor based on the data in window 222; and the third training data set may include a tensor based on the data in window 223. However, because no data exists beyond time k, the fourth and fifth training data sets may not include any data from the second data set 220 associated with the second user. Because no data exists in the second data set 220 beyond time k, the models trained using the fourth and fifth training data sets may be trained using only data for users that do have data within the time windows associated with these training data sets. Thus, the models trained using the fourth and fifth training data sets may avoid being trained using data that may negatively impact the ability of these models to accurately predict the occurrence of an event occurring during the time windows associated with the fourth and fifth training data sets.

The structure of the tensors 211-215 and 221-223 generally depends on the model architecture selected for the event prediction model. In predictive models that make predictions based on fixed-size tensors representing user data, the tensors may include information identifying a number of times each of a plurality of actions within a software application was performed within a given time window. Thus, a training data set bootstrapper can generate tensors for each of the training data sets by counting the number of times each of a plurality of specified actions were performed and including that information in the tensor, as well as an indication of whether a specified event occurred during the time window or in a previous time window. In predictive models that make predictions using time-series data, user activity history may be divided into discrete portions based on the selected bootstrap breakpoints and each portion of the user activity history may be mapped to an indication of whether a given event related to a software application occurred during the time window or in a previous time window.

Example Computer-Implemented Method for Training a Time-Domain Bootstrapped Event Prediction Model FIG. 3 illustrates example operations 300 for training a time-domain bootstrapped event prediction model to predict event occurrence in a software application. The operations described herein may be performed, for example, by a training data set bootstrapper and predictive model trainer executing on a computing environment in a computing environment (e.g., by training data set bootstrapper 112 and predictive model trainer 114 of predictive model generator 110, as illustrated in FIG. 1).

As illustrated, operations 300 begin at block 310, where a training data set is received. The training data set generally includes a plurality of tensors, and each tensor includes data related to user activity in a software application and a time at which an event related to the software application occurred. Generally, the training data set may include "baked" data, where the event has already occurred for the user, and "unbaked" data, where the event has not yet occurred. For unbaked data, the time at which the event occurred may be a null value or some other reserved value indicating that the event has not yet occurred.

In some embodiments, the training data set includes raw event log data. The raw event logged data may include a timestamp associated with each instance of user activity within the software application and information identifying the user activity. The information identifying the user activity may include, for example, clickstream data identifying activity performed with respect to various user interface elements in the software application, information identifying when certain functionality is invoked, or other time-series data identifying a sequence of actions performed within the software application. In some embodiments, the user activity may include information identifying a number of occurrences of one or more specific actions performed within the software application.

At block 320, a plurality of second training data sets are generated from the training data set. Each one of the second training data sets includes data from the training data set over a plurality of non-overlapping time windows.

In some embodiments, the plurality of non-overlapping time windows include time windows defined based on randomly selected time breakpoints over the training data set. The randomly selected time breakpoints may be selected from a set of numbers between a defined minimum and a defined maximum difference relative to a previous time breakpoint (or the origin time). The selected time breakpoints may monotonically increase such that a first breakpoint is earlier than a second breakpoint, the second breakpoint is earlier than a third breakpoint, and so on. As discussed, in randomly selecting these time breakpoints, a plurality of non-overlapping time windows may be generated such that a training data set is divided into data from an origin time to the first breakpoint, from after the first breakpoint to the second breakpoint, from after the second breakpoint to the third breakpoint, and so on.

To generate each of the plurality of second training data sets, the data in the received training data set may be divided based on the randomly selected time breakpoints. Tensors generated for each of the plurality of second training data sets may be based on whether the model is a long-short term memory (LSTM) model or other model that makes predictions based on time-series data and timing relationships between entries in the time-series data or whether the model can make predictions based on scalar data for each of a plurality of types of user activity within the software application. For models that make predictions based on time-series data, the data in the received training data set may be divided into discrete segments of time-series data corresponding to the time windows defined by the randomly selected time breakpoints. For models that make predictions based on scalar data, the data in the received training data set may be transformed into a summary tensor including a count of the number of times each of a plurality of actions was performed within the software application.

At block 330, a time-domain bootstrapped event prediction model is trained using the plurality of second training data sets. Generally, the time-domain bootstrapped event prediction model includes a plurality of models ensembled to form a single model. Each one of the plurality of models may be trained based on a second training data set from the plurality of second data sets associated with one of the plurality of non-overlapping time windows. The output of the time-domain bootstrapped event prediction model may be an output based on conditional probabilities generated for an input by each model in the plurality of models. In one example, the time-domain bootstrapped event prediction model may be trained to predict a likelihood that a user of the software application will perform a specified event related to the software application based on user activity history within the software application.

Example Computer-Implemented Method for Predicting Event Occurrence in a Software Application Using a Time-Domain Bootstrapped Event Prediction Model FIG. 4 illustrates example operations 400 for predicting event occurrence in a software application using a time-domain bootstrapped event prediction model. The operations described herein may be performed, for example, by an event predictor and an application feature recommender (e.g., by event predictor 124 and application feature recommender 126 executing on application server 120, as illustrated in FIG. 1).

Operations 400 may begin at block 410, in which a data set of user activity within a software application is received. The data set of user activity generally includes time-stamped data associated with various user actions logged during use of the software application and may be received from a user activity history data store.

At block 420, a request to predict a likelihood of an event occurring with respect to the software application is received. Generally, the prediction of the likelihood of the event occurring may be based on the data set of user activity. In some embodiments, the request may be received at specified times during user interaction with the software application, such as when a user initiates a session in the software application or terminates the session in the software application. The request may also be received, for example, after the software application detects that the user has been idle for more than a threshold amount of time; has performed a threshold number of the same action within a time window, or the like.

At block 430, a likelihood of the event occurring is predicted using an event prediction model. The event prediction model is generally configured to predict the likelihood of the event occurring based on a likelihood over each of a plurality of non-overlapping time windows. A likelihood of the event occurring within a first time window is generally conditioned on a likelihood of the event occurring with a second time window of the plurality of non-overlapping time windows. The event prediction model can predict the likelihood that a user will perform a specified event, such as discontinuing use of the application (e.g., cancelling a subscription to use an application made available as a service), discontinuing use of an extension or add-on for the application, upgrading a subscription to use a version of the application with additional features, connecting extensions or add-ons to the application, or the like.

In some embodiments, the event prediction model includes a plurality of time-domain bootstrapped models. Each one of the plurality of time-domain bootstrapped models may be trained to predict a likelihood of the event occurring over one of the plurality of non-overlapping time windows. As discussed, each one of the plurality of time-domain bootstrapped models may be trained using a training data set defined by one or more of a set of randomly selected bootstrap breakpoints.

In some embodiments, the event prediction model can predict the occurrence of the event based on a statistical measure over conditional probabilities generated for the received data set by each time-domain bootstrap model in the plurality of time-domain bootstrapped models. For example, the event prediction model can predict the occurrence of the event based on an average over the conditional probabilities generated for the received data set, a median value of the conditional probabilities generated for the received data set, or the like.

At block 440, one or more actions are taken within the software application based on the predicted likelihood.

In some embodiments, the one or more actions includes identifying, from the data set, a plurality of features in the software application used by the user. For each respective feature of the plurality of features, a predicted probability of the user discontinuing use of the application is generated based on a midpoint value associated with the respective feature. The midpoint value may, for example, be an average or median number of occurrences of actions related to the respective feature determined over a universe of users of the application. Usage of a product feature is recommended based on the generated predicted probabilities. Generally, the product feature recommended may be the feature corresponding to a largest change in a predicted probability of the user discontinuing use of the software application. The recommended product feature may be based on a mapping between a model input feature corresponding to activity within the software application and a product feature to be recommended.

Figure 5:
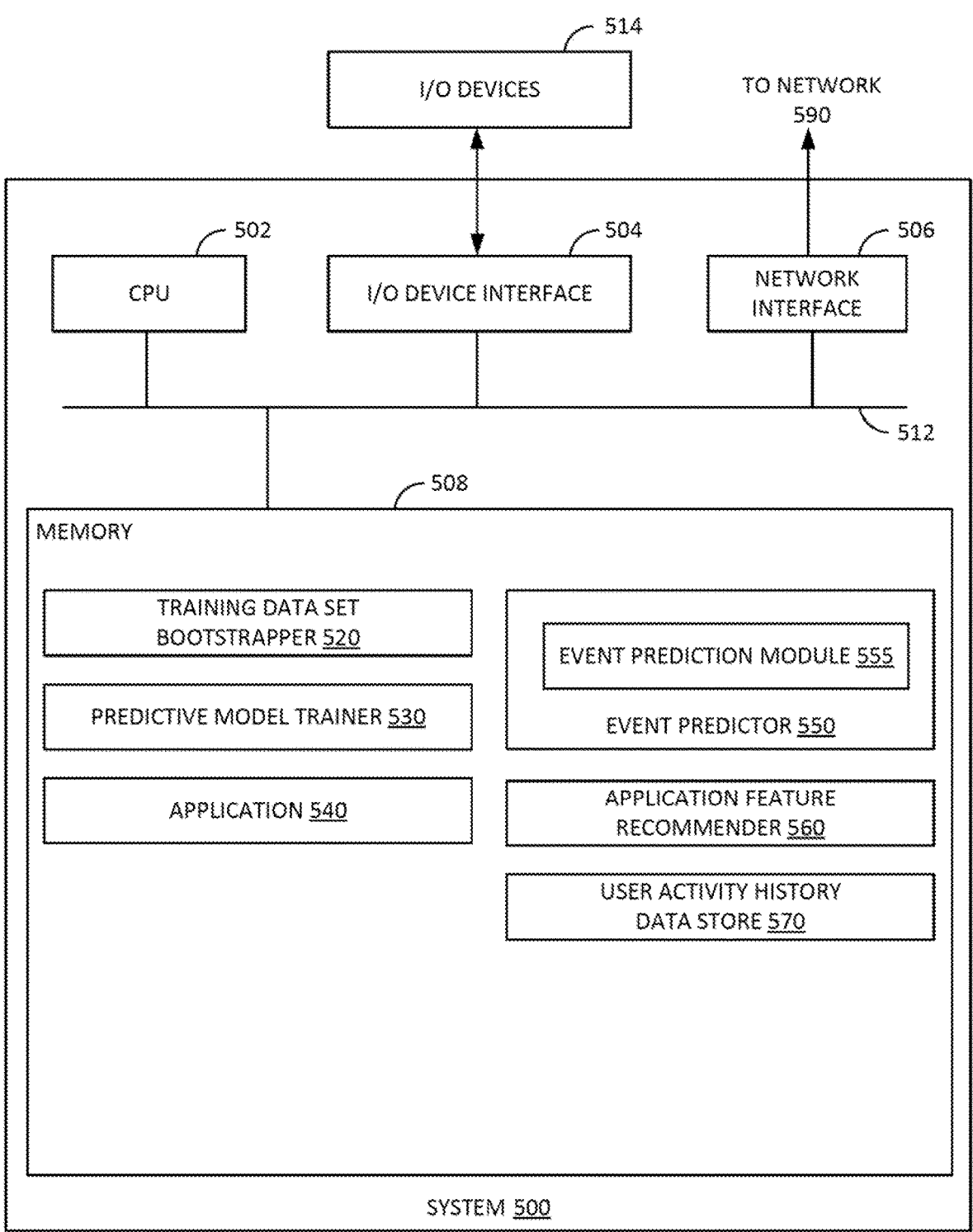
FIG. 5 illustrates an example computing system with which embodiments of the present disclosure may be implemented.

Example System for Training and Using Time-Domain Bootstrapped Event Prediction Models to Predict a Likelihood of an Event Occurring in a Software Application FIG. 5 illustrates an example system 500 that trains and uses time-domain bootstrapped event prediction models to predict a likelihood of an event occurring in a software application. In one example, system 500 may comprise predictive model generator 110 and application server 120 illustrated in FIG. 1.

As shown, system 500 includes a central processing unit (CPU) 502, one or more I/O device interfaces 504 that may allow for the connection of various I/O devices 514 (e.g., keyboards, displays, mouse devices, pen input, etc.) to the system 500, network interface 506 through which system 500 is connected to network 590 (which may be a local network, an intranet, the internet, or any other group of computing devices communicatively connected to each other), a memory 508, and an interconnect 512.

CPU 502 may retrieve and execute programming instructions stored in the memory 508. Similarly, the CPU 502 may retrieve and store application data residing in the memory 508. The interconnect 512 transmits programming instructions and application data, among the CPU 502, I/O device interface 504, network interface 504, and memory 508.

CPU 502 is included to be representative of a single CPU, multiple CPUs, a single CPU having multiple processing cores, and the like.

Memory 508 is representative of a volatile memory, such as a random access memory, or a nonvolatile memory, such as nonvolatile random access memory, phase change random access memory, or the like. As shown, memory 508 includes a training data set bootstrapper 520, a predictive model trainer 530, an application 540, an event predictor 550, an application feature recommender 560, and a user activity history data store 570.

Training data set bootstrapper 520 may correspond to training data set bootstrapper 112 illustrated in FIG. 1. Generally, training data set bootstrapper 520 selects a random number of bootstrap breakpoints and divides a training data set of user activity data (e.g., retrieved from user activity history data store 570, which may correspond to user activity history data store 130 illustrated in FIG. 1) into a plurality of second training data sets. Each training data set of the plurality of second training data sets is associated with one of a plurality of non-overlapping time windows.

Predictive model trainer 530 may correspond to predictive model trainer 114 illustrated in FIG. 1. Generally, predictive model trainer 530 trains an event prediction model 555 used by event predictor 550 based on the training data sets generated by training data set bootstrapper 520. The event prediction model may be structured as an ensemble of a plurality of machine learning models, and each one of the plurality of machine learning models may be trained using one of a plurality of training data sets associated with one of a plurality of non-overlapping time windows. Generally, the event prediction model may be configured to predict the likelihood of an event occurring as a series of conditional probabilities, where the likelihood of an event occurring in a first time window is conditioned on the likelihood of the event occurring in a second, earlier, time window.

Application 540 may correspond to application 122 illustrated in FIG. 1. Generally, application 540 may allow for users to initiate sessions within the application, and user activity within the application may be recorded, committed to user activity history data store 570, and used by an event prediction model to predict a likelihood of an event occurring with respect to application 540.

Event predictor 550 may correspond to event predictor 124 illustrated in FIG. 1. Generally, event predictor 550 uses a time-domain bootstrapped event prediction model 555 trained by predictive model trainer 114 to predict the likelihood that a specified event with respect to application 540 will occur. To predict the likelihood that the event will occur, event predictor 550 can retrieve user activity history from user activity history data store 570 and divide the retrieved user activity history into a plurality of input data sets based on the randomly selected bootstrap breakpoints used to train the time-domain bootstrapped event prediction model 555. The predicted likelihood that the event will occur is generally calculated based on the individual conditional probabilities generated by each of the plurality of models ensembled to form the time-domain bootstrapped event prediction model 555.

Application feature recommender 560 may correspond to application feature recommender 126 illustrated in FIG. 1. Application feature recommender 560 uses the predicted likelihood that the event will occur to perform one or more actions to minimize the likelihood of a negative event (e.g., a user discontinuing use of application 540) occurring or maximize the likelihood of a positive event (e.g., a user upgrading to another version of application 540) occurring. Generally, application feature recommender 560 can use historical user activity data to identify a historical midpoint value to use in estimating a change in a likelihood that the event will occur. Application feature recommender 560 can obtain predictions based on the historical midpoint values from event predictor 550 and can select and execute an action corresponding to the greatest change in the likelihood of the event occurring, such as recommending use of another feature within application 540, providing help content to the user that is likely to retain the user within application 540, or the like.

Example Clauses

Clause 1: A method, comprising: receiving a training data set including a plurality of tensors, each respective tensor in the plurality of tensors including data related to user activity in a software application and an indication of a time at which an event related to the software application occurred; generating, from the training data set, a plurality of second training data sets, each one of the second training data sets including data from the training data set over a plurality of non-overlapping time windows; and training a time-domain bootstrapped event prediction model using the plurality of second training data sets, wherein: the time-domain bootstrapped event prediction model comprises a plurality of models ensembled to form a single model, each one of the plurality of models being trained based on a second training data set associated with one of the plurality of non-overlapping time windows, and the time-domain bootstrapped event prediction model is trained to predict the occurrence of the event based on conditional probabilities generated for an input by each model in the plurality of models.

Clause 2: The method of Clause 1, wherein the plurality of non-overlapping time windows comprises time windows defined based on randomly selected time breakpoints over the training data set.

Clause 3: The method of any one of Clauses 1 or 2, wherein the event prediction model is trained to predict a likelihood that a user of the software application will perform a specified event related to the software application based on user activity history within the software application.

Clause 4: The method of any one of Clauses 1 through 3, wherein the user activity in the software application comprises information identifying a number of occurrences of one or more specific actions performed within the software application.

Clause 5: The method of any one of Clauses 1 through 4, wherein the user activity in the software application comprises time-series data identifying a sequence of actions performed within the software application over the plurality of non-overlapping time windows.

Clause 6: The method of Clause 5, wherein generating the plurality of second training data sets comprises generating, from the training data set, a count for each of a plurality of specific actions performed within the software application by a specific user over each of the plurality of non-overlapping time windows.

Clause 7: The method of any one of Clauses 1 through 6, wherein the training data set includes data for users of the software application for which the event has occurred and data for users of the software application for which the event has not yet occurred.

Clause 8: A method, comprising: receiving a data set of user activity within a software application; receiving a request to predict a likelihood of an event occurring with respect to the software application based on the data set of user activity; predicting, using an event prediction model, a likelihood of the event occurring, wherein the event prediction model is configured to predict the likelihood of the event occurring based on a likelihood over each of a plurality of non-overlapping time windows, and wherein a likelihood of the event occurring within a first time window of the plurality of non-overlapping time windows is conditioned on a likelihood of the event occurring within a second time window of the plurality of non-overlapping time windows; and taking one or more actions within the software application based on the predicted likelihood.

Clause 9: The method of Clause 8, wherein the event prediction model comprises a plurality of time-domain bootstrapped models, each one of the plurality of time-domain bootstrapped models being trained to predict a likelihood of the event occurring over one of the plurality of non-overlapping time windows.

Clause 10: The method of Clause 9, wherein the event prediction model is trained to predict the occurrence of the event over the event prediction model is trained to predict the occurrence of the event as an average over conditional probabilities generated for the received data set by each time-domain bootstrap model in the plurality of time-domain bootstrapped models.

Clause 11: The method of any one of Clauses 8 through 10, wherein the plurality of non-overlapping time windows comprises time windows defined based on randomly selected time breakpoints over a time-series data set.

Clause 12: The method of any one of Clauses 8 through 11, wherein the event prediction model is trained to predict a likelihood that a user of the software application will perform a specified event related to the software application based on the data set of user activity.

Clause 13: The method of Clause 12, wherein taking one or more actions within the software application comprises: identifying, from the data set, a plurality of features in the software application used by the user; for each respective feature of the plurality of features, generating a predicted probability of the user discontinuing use of the software application based on a midpoint value associated with the respective feature; and recommending use of a product feature corresponding to a largest change in predicted probability of the user discontinuing use of the software application.

Clause 14: The method of Clause 13, wherein recommending use of the product feature is based on a mapping between a model input feature corresponding to activity within the software application and a product feature to be recommended.

Clause 15: An apparatus comprising: a memory having executable instructions stored thereon; and a processor configured to execute the executable instructions to cause the apparatus to perform the operations of any one of Clauses 1 through 14.

Clause 16: An apparatus comprising: means for performing the operations of any one of Clauses 1 through 14.

Clause 17: A computer-readable medium having instructions stored thereon which, when executed by a processor, performs the operations of any one of Clauses 1 through 14.

ADDITIONAL CONSIDERATIONS

The preceding description is provided to enable any person skilled in the art to practice the various embodiments described herein. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

A processing system may be implemented with a bus architecture. The bus may include any number of interconnecting buses and bridges depending on the specific application of the processing system and the overall design constraints. The bus may link together various circuits including a processor, machine-readable media, and input/output devices, among others. A user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media, such as any medium that facilitates transfer of a computer program from one place to another. The processor may be responsible for managing the bus and general processing, including the execution of software modules stored on the computer-readable storage media. A computer-readable storage medium may be coupled to a processor such that the processor can read information from, and write information to, the storage medium. In the alternative, the storage medium may be integral to the processor. By way of example, the computer-readable media may include a transmission line, a carrier wave modulated by data, and/or a computer readable storage medium with instructions stored thereon separate from the wireless node, all of which may be accessed by the processor through the bus interface. Alternatively, or in addition, the computer-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module, it will be understood that such functionality is implemented by the processor when executing instructions from that software module.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method, comprising:

receiving a training data set including a plurality of tensors, each respective tensor in the plurality of tensors including data related to user activity in a software application and an indication of a time at which an event related to the software application occurred;

generating, from the training data set, a plurality of second training data sets, each one of the plurality of second training data sets corresponding to a respective time window, of a plurality of non-overlapping time windows, of the training data set and including data from the training data set that occurs within the respective time window, wherein the training data set is divided at randomly selected time breakpoints into the plurality of non-overlapping time windows, and wherein the randomly selected time breakpoints monotonically increase and are selected from a set of numbers between a defined minimum difference and a defined maximum difference relative to a previous time breakpoint;

training a time-domain bootstrapped event prediction model using the plurality of second training data sets, wherein:

the time-domain bootstrapped event prediction model comprises a plurality of models ensembled to form a single model, each one of the plurality of models being trained based on a respective second training data set associated with one of the plurality of non-overlapping time windows, and the time-domain bootstrapped event prediction model is trained to predict, for an input, a likelihood of the event occurring based on a plurality of likelihoods respectively generated by the plurality of models, wherein each model of the plurality of models is trained to predict a likelihood of the event occurring over a respective time window of the plurality of non-overlapping time windows; and configuring a feature recommender to determine whether to take one or more actions within the software application by comparing, to threshold likelihood values, the predicted likelihood of the event occurring that is generated using the time-domain bootstrapped event prediction model.

2. The method of claim 1, wherein the event prediction model is trained to predict a likelihood that a user of the software application will perform a specified event related to the software application based on user activity history within the software application.

3. The method of claim 1, wherein the data related to user activity in the software application comprises information identifying a number of occurrences of one or more specific actions performed within the software application.

4. The method of claim 1, wherein the data related to user activity in the software application comprises time-series data identifying a sequence of actions performed within the software application over the plurality of non-overlapping time windows.

5. The method of claim 4, wherein generating the plurality of second training data sets comprises generating, from the training data set, a count for each of a plurality of specific actions performed within the software application by a specific user over each of the plurality of non-overlapping time windows.

6. The method of claim 1, wherein the training data set includes data for users of the software application for which the event has occurred and data for users of the software application for which the event has not yet occurred.

7. A method, comprising:

receiving a data set of user activity within a software application;

receiving a request to predict a likelihood of an event occurring with respect to the software application based on the data set of user activity;

predicting, using an event prediction model, an overall likelihood of the event occurring based on the data set of user activity, wherein:

the event prediction model comprises a plurality of models ensembled to form a single model, each of the plurality of models being trained using a respective one of a plurality of subsets of training data, the training data including a plurality of tensors, each respective tensor in the plurality of tensors including data related to user activity in the software application and an indication of a time at which the event related to the software application occurred, each of the plurality of subsets of the training data corresponding to and including training data from a single respective time window, of a plurality of non-overlapping time windows, of the training data, wherein the training data is divided at randomly selected time breakpoints into the plurality of non-overlapping time windows, the randomly selected time breakpoints monotonically increasing and selected from a set of numbers between a defined minimum difference and a defined maximum difference relative to a previous time breakpoint, and the event prediction model is trained to predict, for an input, an overall likelihood of the event occurring based on a plurality of likelihoods respectively generated by the plurality of models, wherein each of the plurality of models is trained to predict a likelihood of the event occurring over a respective time window of the plurality of non-overlapping time windows, and wherein a likelihood of the event occurring within a first time window of the plurality of non-overlapping time windows is conditioned on a likelihood of the event occurring within a second time window of the plurality of non-overlapping time windows;

determining whether to take one or more actions within the software application by comparing the predicted overall likelihood of the event occurring to threshold likelihood values; and taking the one or more actions within the software application based on the comparing the predicted overall likelihood of the event occurring to the threshold likelihood values.

8. The method of claim 7, wherein the event prediction model is trained to predict the overall likelihood of the event occurring over the plurality of non-overlapping time windows as an average over a plurality of conditional probabilities generated for the received data set by the plurality of models.

9. The method of claim 7, wherein the event prediction model is trained to predict a likelihood that a user of the software application will perform a specified event related to the software application based on the data set of user activity.

10. The method of claim 9, wherein taking one or more actions within the software application comprises:

identifying, from the data set, a plurality of features in the software application used by the user;

for each respective feature of the plurality of features, generating a predicted probability of the user discontinuing use of the software application based on a midpoint value associated with the respective feature; and recommending use of a product feature corresponding to a largest change in predicted probability of the user discontinuing use of the software application.

11. The method of claim 10, wherein recommending use of the product feature is based on a mapping between a model input feature corresponding to activity within the software application and a product feature to be recommended.

12. A system, comprising:

a memory having executable instructions stored thereon; and a processor configured to execute the executable instructions to cause the system to:

receive a data set of user activity within a software application receive a request to predict a likelihood of an event occurring with respect to the software application based on the data set of user activity;

predict, using an event prediction model, an overall likelihood of the event occurring based on the data set of user activity wherein:

the event prediction model comprises a plurality of models ensembled to form a single model, each of the plurality of models being trained using a respective one of a plurality of subsets of training data, the training data including a plurality of tensors, each respective tensor in the plurality of tensors including data related to user activity in the software application and an indication of a time at which the event related to the software application occurred, each of the plurality of sub sets of the training data corresponding to and including training data from a single respective time window, of a plurality of non-overlapping time windows, of the training data, wherein the training data is divided at randomly selected time breakpoints into the plurality of non-overlapping time windows, the randomly selected time breakpoints monotonically increasing and selected from a set of numbers between a defined minimum difference and a defined maximum difference relative to a previous time breakpoint, and the event prediction model is trained to predict, for an input, an overall likelihood of the event occurring based on a plurality of likelihoods respectively generated by the plurality of models, wherein each of the plurality of models is trained to predict a likelihood of the event occurring over a respective time window of the plurality of non-overlapping time windows, and wherein a likelihood of the event occurring within a first time window of the plurality of non-overlapping time windows is conditioned on a likelihood of the event occurring within a second time window of the plurality of non-overlapping time windows;

determine whether to take one or more actions within the software application by comparing the predicted overall likelihood of the event occurring to threshold likelihood values; and take the one or more actions within the software application based on the comparing the predicted overall likelihood of the event occurring to the threshold likelihood values.

13. The system of claim 12, wherein:

the event prediction model is trained to predict the overall likelihood of the event occurring over the plurality of non-overlapping time windows as an average over a plurality of conditional probabilities generated for the received data set by the plurality of models.

14. The system of claim 12, wherein the event prediction model is trained to predict a likelihood that a user of the software application will discontinue use of the software application based on the data set of user activity.

15. The system of claim 14, wherein in order to take one or more actions within the software application, the processor is configured to:

identify, from the data set, a plurality of features in the software application used by the user;

for each respective feature of the plurality of features, generate a predicted probability of the user discontinuing use of the software application based on a midpoint value associated with the respective feature; and recommend use of a product feature corresponding to a largest change in predicted probability of the user discontinuing use of the software application.

16. The system of claim 15, wherein the processor is configured to recommend use of the product feature based on a mapping between a model input feature corresponding to activity within the software application and a product feature to be recommended.

* * * * *